Figure 1:
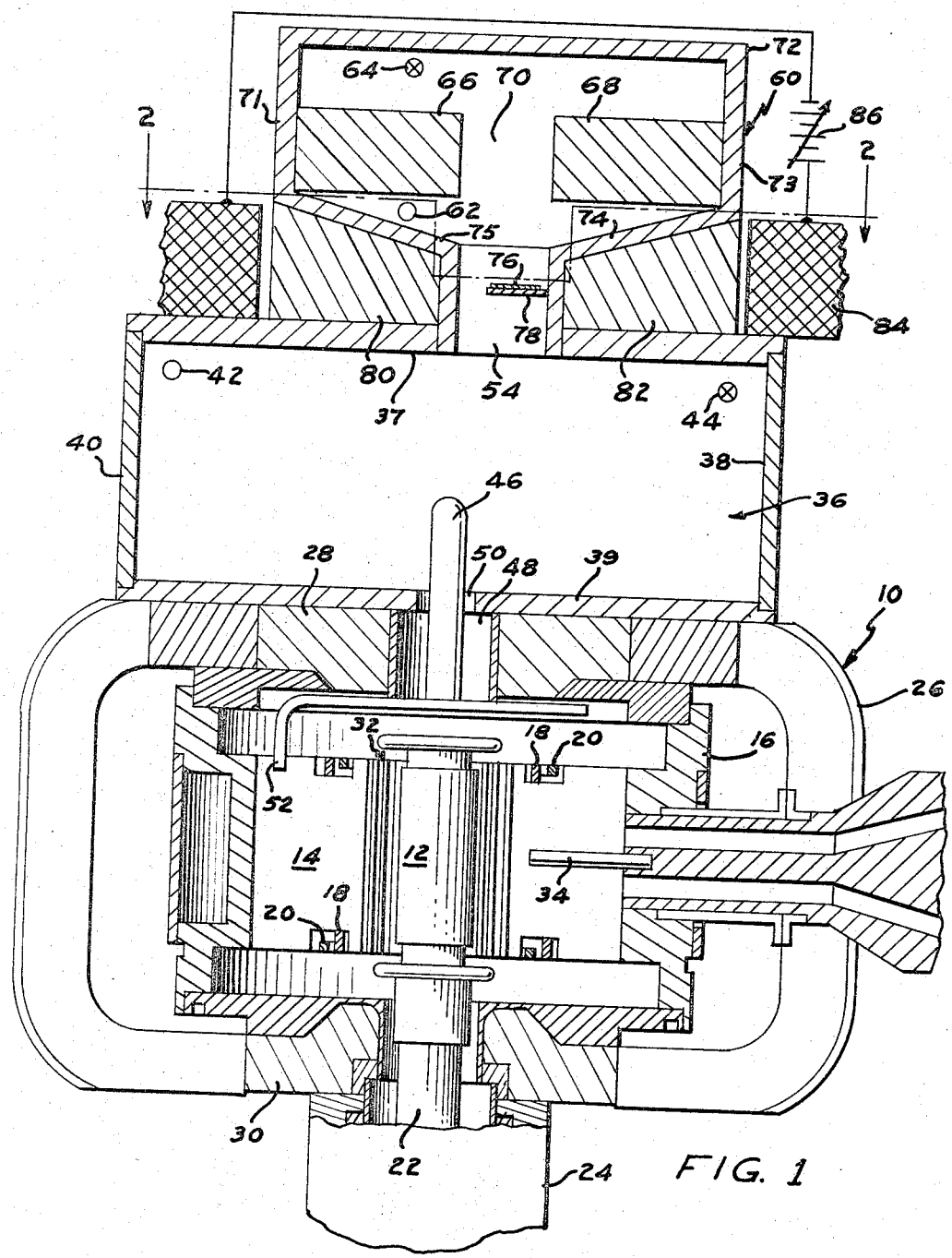

Aug. 1, 1967 R. F. PLUMRIDGE 3,334,267
FERRITE TUNED CAVITY STABLIZED MAGNETRON
Filed Aug. 12, 1966
2 Sheets-Sheet 1

INVENTOR
ROBERT F. PLUMRIDGE
BY
ATTORNEY 3,334,267
FERRITE TUNED CAVITY STABILIZED
MAGNETRON
Robert F. Plumridge, Lexington, Mass., assignor to Raytheon Company, Lexington, Mass., a corporation of Delaware
Filed Aug. 12, 1966, Ser. No. 572,142
10 Claims. (Cl. 315—39.55)

The present invention relates generally to electron discharge devices for the generation of high frequency electromagnetic energy and more specifically to such devices having appended cavity resonator means for stabilizing the frequency of oscillations.

In a copending patent application of Edward T. Downing, Ser. No. 311,490, filed Sept. 25, 1963, and assigned to the assignee of the present invention, a frequency stabilized magnetron is disclosed employing a single high Q $TM_{01}$ cavity resonator which is tightly coupled to the conventional anode cavity resonator structure of a magnetron type oscillator. Stabilization is achieved by maintaining stored electromagnetic energy in the combined anode-external cavity resonator systems with the latter cavity resonator behaving as a narrow $\pi$ mode passband filter. The over-all structure is relatively compact in size and the stabilizing cavity resonator is longitudinally displaced from the anode circuit.

Frequency tuning of the devices under consideration is accomplished by mechanical means comprising a deformable wall structure for varying the internal dimensions of the stabilizing cavity resonator. Axial motion of the mechanical tuning means will thereby increase or decrease the frequency of the electromagnetic oscillations. Such mechanical structures are difficult to calibrate and activate accurately to achieve the desired output frequency of oscillations. Additionally, such structures result in problems with access to the tuning means in an over-all radar system where space is always at a premium. In applications such as in airborne systems where space, size and weight are critical factors as well as accuracy in tuning, the elimination of the disadvantages of prior art mechanical tuning structures is highly desirable.

Accordingly, it is an object of the present invention to provide a cavity stabilized electromagnetic energy generator having a new and unique tuning means for the varying of the resonant frequency of operation.

A further object of the present invention is the provision of a cavity stabilized magnetron oscillator which is electrically tunable to the resonant frequency of operation.

A still further object of the present invention is the provision of a magnetron oscillator having mutually inductive coupled stabilizing and auxiliary cavity resonators together with a variably energized ferromagnetic material disposed therebetween with the effective permeability of said ferromagnetic means being selectively altered by external D.C. magnetic field producing means.

In accordance with the teachings of the present invention the high frequency electromagnetic energy resistivity as well as the phenomenon of ferromagnetic resonances of ferrite materials is utilized in combination with a two cavity resonator system wherein the high frequency magnetic field parameters are mutually inductive in the composite system. Placement of magnetically permeable materials such as ferromagnetic bodies in the mutually inductive region provides a unique means for varying the coupling between the two cavity resonators. Changes in the real part of the effective permeability of the ferromagnetic material determines the variation in the mutual inductances which become dependent on an applied external D.C. magnetic field. Pole piece members are provided adjacent to the ferromagnetic material loaded region to assist in the concentration of the magnetic field supplied by the electrically variable means. The principle feature of the disclosed structure resides in the relatively small volume of material required to achieve the tuning range in comparison with known cavity resonator stuctures wherein the ferromagnetic material is directly loaded within the confines of the cavity. As a result of the new technique the reduction of excessive losses due to the imaginary part of the effective permeability are substantially reduced and the design of higher power and wider tuning range oscillators is achieved. Further, the smaller volume of required ferromagnetic material simplified the external magnetic circuitry required with an accompanying reduction in the physical size of the over-all device and the power requirements for the actuation of this circuit. Such a decrease in the power requirements is highly desirable since such materials are sensitive to thermal changes and in the present device such thermal problems are substantially alleviated while providing an accurately tunable frequency stabilized oscillator.

Figure 2:
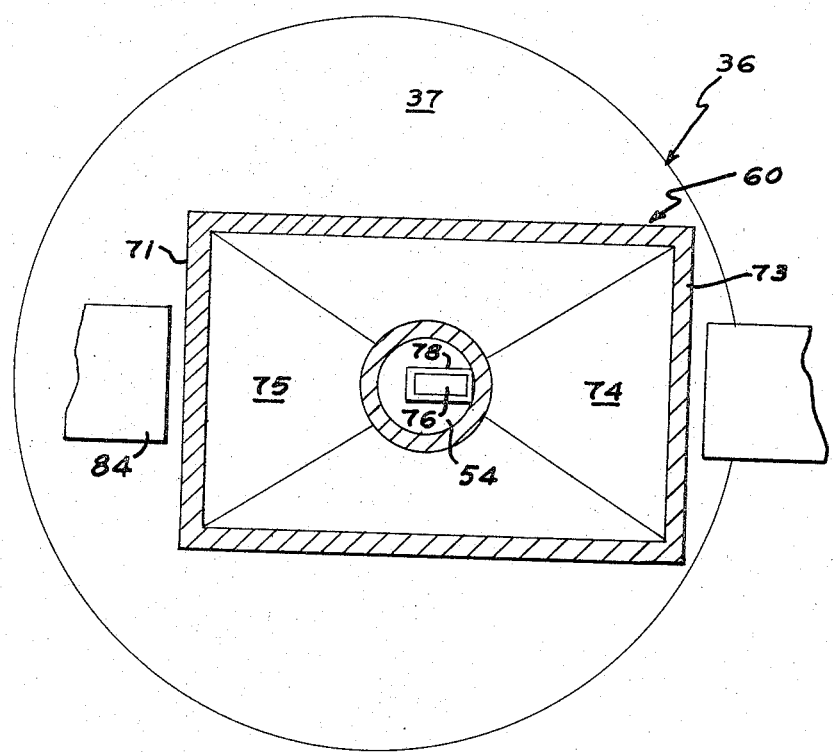

Other objects, features and advantages will be readily apparent after consideration of the following detailed description together with the accompanying drawings, in which:

FIG. 1 is a vertical cross-sectional view of the illustrative embodiment of the invention; and FIG. 2 is a view along the line 2—2 in FIG. 1.

Referring to the drawings, the embodiment of the invention comprises high frequency electromagnetic oscillator 10 of the magnetron type haing a cylindrical cathode element 12 disposed axially within an anode cavity resonator system defined by vane members 14 joined to a common boundary wall 16. Alternate anode vane members 14 may be interconnected by means of circular conductive straps 18 and 20 in the manner well known in the art. The cathode element 12 is connected to external circuitry by means of lead 22 extending within the tubular member 24 to yield the emission of electrons.

Magnetic circuit means for the maintenance of a magnetic field parallel to the axis of the cathode element includes permanent magnets 26 together with magnetic pole piece members 28 and 30 disposed on opposing sides of an anode-cathode interaction region 32. The output oscillations are coupled to the utilization load by loop 34 disposed in one of the anode cavity resonators in the manner well known in the art.

In accordance with the teachings of the aforementioned copending patent application frequency stabilizing cavity resonator 36 is disposed axially adjacent to the interaction region 32. Wall members 37, 38, 39 and 40 delineate the desired cavity dimensions to establish electromagnetic resonance fields which will illustratively be in the $TM_{01}$ mode configuration. It may be noted that the device may also be operated with other mode configurations such as $TE_{11}$ and $TM_{11}$, among others, with satisfactory results. In the illustrative mode configuration the magnetic field vector lines extend transverse to the cathode element axis and are directed in a plane perpendicular to the surface of the drawing as indicated by the open circle 42. The electric field vector lines in this mode configuration extend coaxially with the cathode element axis and between the wall members 37 and 39. The coupling of electromagnetic energy between the anode cavity resonator structure and the stabilizing cavity resonator may be accomplished by either electric or magnetic field coupling in the manner well known in the art. For electric field coupling a conductive probe member 46 extends through a hollow passageway 48 in pole piece member 28 and an aperture 50 in cavity wall member 39. Conductive leg members 52 are radially joined to probe member 46 and disposed within alternate anode cavity resonators in a symmetrical array. It is noted that probe member 46 extends parallel to the disposition of the electric field vector lines. It is also permissible in the practice of the invention to utilize other type coupling structures such as coupling loops joined to the anode vane members and in contact with one of the stabilizing cavity wall members. In the case of magnetic field coupling the back wall sections of alternate anode cavity resonators will protrude into the stabilizing cavity resonator 36 where the magnetic fields of the anode vane members couple directly to those in the $TM_{01}$ stabilizing cavity.

In accordance with the present invention a coupling iris opening 54 is provided in upper wall member 37 of the stabilizing cavity 36. An auxiliary cavity resonator 60 is disposed adjacent to the frequency stabilizing cavity resonator and the high frequency electromagnetic energy stored in the latter cavity resonator will induce electromagnetic energy in the second cavity resonator in the coaxial type resonance modes with the magnetic field lines indicated by the open circle 62 and the circle with a cross 64. It will be noted that the induced high frequency magnetic field is perpendicular to that excited in the frequency stabilizing cavity resonator 36. The two cavity resonator system is mutually inductive coupled and it will be noted that the high frequency electric fields in the vicinity of the coupling iris are low while the intensity of the mutual magnetic fields is at a maximum value. Cavity resonator 60 includes double reentrant post members 66 and 68 defining a gap 70 therebetween in alignment with the iris opening 54 as well as wall members 71, 72, 73, 74 and 75.

A ferromagnetic body 76 selected from the well known ferrites such as yttrium iron garnet is supported in the mutual inductive region by metallic member 78. Pole piece members 80 and 82 are utilized to concentrate a D.C. magnetic field in the vicinity of the ferrite body 76. Such a D.C. magnetic field is desirably applied by electromagnetic means 84 which is connected to a variable voltage source 86 with the field directed transverse to the high frequency magnetic fields. By varying the external magnetic field applied to the ferrite body the effective permeability of the material is altered. By reason of the placement of this ferrite body in the mutual inductance region between the two cavity resonators any alteration in the mutual coupling will result in a resonant frequency change in the magnetron device coupled to one of the cavity resonators of the mutually inductively coupled system. Electrical tuning is therefore achieved simply by variations in the external D.C. magnetic field applied to the ferrite body. In an exemplary embodiment a ferrite body of about .040 inch in thickness and .125 inch long was utilized in the tuning of frequencies in the X-band frequency of oscillations.

It has been observed that a smaller volume of ferrite material, together with the accompanying lower external magnetic field circuit requirements, is evolved by the teachings of the present invention. Since the ferrite material is disposed in the coupling area and not in the cavity itself the dielectric losses attendant in the use of such materials is substantially reduced. In conventional ferrite loaded resonant cavities a larger volume of the ferrite material is required with a limitation of the size imposed by the dielectric losses introduced. Ideally, the present invention provides a smaller volume of ferrite material to tune over an equivalent tuning range as the ferrite loaded resonant cavity tuning structure to thereby reduce the over-all ferromagnetic losses. As a result oscillator devices may be designed for higher power and wider tuning ranges than was heretofore permissible.

It will be evident that the mutually inductively coupled two cavity resonator system for electrically tuning oscillator structures by changing the mutual coupling may be utilized by other known oscillator devices with comparable results. Additionally, many modifications may be realized in the provision of the pole piece members as well as the means for the provision of the D.C. magnetic field permeating the ferromagnetic material. Desirably, such external magnetic field is applied in a direction which is transverse to the induced high frequency magnetic fields in the cavity members appended to the oscillator.

While this invention has been described with reference to a $TM_{01}$ frequency stabilizing cavity, other mode configuration cavities may be suitably utilized in accordance with this invention. Furthermore, while the invention has been described herein in terms of preferred embodiments, it is intended that specific details of construction be interpreted broadly and not in a limiting sense in accordance with the scope and definition as set forth in the appended claims.

What is claimed is:

1. In combination:
    means for generation of high frequency electromagnetic energy oscillations;
    first frequency stabilizing cavity resonator means tightly coupled to said generation means for establishing electromagnetic field configurations within said cavity resonator associated with said oscillations;
    means for electrically varying the frequency of said oscillations comprising second cavity resonator means mutually inductively coupled to said first cavity resonator means;
    ferromagnetic material means disposed in the mutually inductive region between said first and second cavity resonator means;
    and external D.C. magnetic field producing means operatively associated with said ferromagnetic means to variably alter the effective permeability thereof and thereby vary the mutual inductance between said cavity resonator means with a corresponding variation in the resultant resonant frequency of said oscillations.

2. In combination:
    a magnetron oscillator comprising a cathode element;
    an anode element defining a plurality of cavity resonators circumferentially disposed about said cathode element and forming an interaction space therebetween;
    a frequency stabilizing cavity resonator axially disposed adjacent said interaction space;
    means for coupling energy between said stabilizing cavity and alternate anode cavity resonators to establish within said stabilizing cavity resonator electromagnetic fields associated with the mode of resonance of said oscillations;
    an auxiliary cavity resonator mutually inductively coupled to said frequency stabilizing cavity resonator;
    a body of a ferromagnetic material disposed in the mutually inductive region between said cavity resonators;
    and external D.C. magnetic field producing means for variably energizing said ferromagnetic body to alter its effective permeability and correspondingly vary the mutual inductance between said cavity resonators with a resultant variation of the resonant frequency of the oscillations from said magnetron oscillator.

3. The combination in accordance with claim 2 wherein said frequency stabilizing cavity resonator is dimensioned to sustain oscillations in the $TM_{01}$ mode configuration.

4. The combination in accordance with claim 2 wherein said auxiliary cavity resonator includes double reentrant conductive post members defining therebetween a gap for establishing a coaxial mode type of resonance oscillations.

5. An electrically tuned high frequency electromagnetic energy generator comprising:
    a cathode element;
    an anode element defining a plurality of cavity resonators circumferentially disposed about said cathode element and forming an interaction space therebetween;

means for providing a magnetic field parallel to the longitudinal axis of said cathode element;

a frequency stabilizing cavity resonator axially disposed adjacent said interaction space;

means for coupling the electromagnetic energy from alternate anode cavity resonators to establish within said stabilizing cavity resonator electromagnetic fields associated with the mode of resonance of said energy;

an auxiliary cavity resonator adjacent to and coupled to said frequency stabilizing cavity resonator by means of an opening defined in a wall member of said latter resonator in the region where said electromagnetic fields are mutually inductively coupled to excite coaxial resonance modes in said auxlary cavity resonator;

a body of ferromagnetic material disposed in said opening;

and an electrically actuated D.C. magnetic field applied to said ferromagnetic body for altering its effective permeablty and correspondng varyng the mutual inductance coupling between said frequency stabilizing and auxiliary cavity resonators with a resultant variation in the resonant frequency of oscillations of the electromagnetic energy.

6. An electrically tuned high frequency electromagnetic energy generator in accordance with claim 5 wherein the frequency stabilized cavity is dimensioned to sustain oscillations in $TM_{01}$ mode configuration.

7. An electrically tuned high frequency electromagnetic energy generator in accordance with claim 5 wherein said D.C. magnetic field is applied normal to the longitudinal axis of said cathode element.

8. A magnetron oscillator comprising:
a cathode element;
an anode element defining a plurality of cavity resonators circumferentially disposed about said cathode element and forming an interaction space therebetween;
means for providing a magnetic field parallel to the longitudinal axis of said cathode element;
a frequency stabilizing cavity resonator axially disposed adjacent said interaction space;

means for coupling electromagnetic energy from alternate anode cavity resonators to establish within said stabilizing cavity resonator electric and magnetic fields associated with high frequency oscillations with said magnetic fields extending transverse to the longitudinal axis of the cathode element;

an auxiliary cavity resonator adjacent to and coupled to said frequency stabilizing cavity resonator by means of an iris opening defined in a wall member of sad latter member n the regon where sad electric and magnetic field configurations mutually induce coaxial resonance mode oscillations of the electromagnetic energy with the high frequency magnetic fields extending perpendicular to the magnetic fields within said frequency stabilizing cavity resonator;

a body of ferromagnetic material disposed in said iris opening;

and an electrically actuated D.C. magnetic field applied to said ferromagnetic body in a direction transverse to both of said high frqeuency magnetic fields to alter the effective permeability of said ferromagnetic body and correspondingly vary the mutual inductance coupling between said frequency stabilizing and auxiliary cavity resonators with a resultant variation in the resonant frequency of the generated oscillations.

9. A magnetron oscillator in accordance with claim 8 wherein said frequency stabilizing cavity is dimensioned to sustain oscillations in the $TM_{01}$ mode configuration.

10. A magnetron oscillator in accordance with claim 8 wherein said auxiliary cavity resonator includes double reentrant conductive post members defining therebetween a gap aligned with the iris opening in the mutually inductive region between said frequency stabilizing and auxiliary cavity resonators.

No reference cited.

HERMAN KARL SAALBACH, *Primary Examiner.*